(12) United States Patent
Huang et al.

(10) Patent No.: US 12,700,580 B2
(45) Date of Patent: Aug. 4, 2026

(54) NEGATIVE ELECTRODE PLATE, SECONDARY BATTERY, BATTERY MODULE, BATTERY PACK, AND POWER CONSUMING DEVICE

(71) Applicant: CONTEMPORARY AMPEREX TECHNOLOGY (HONG KONG) LIMITED, Hong Kong (CN)

(72) Inventors: Yuping Huang, Ningde (CN); Yunjian Ma, Ningde (CN); Mingfeng Lin, Ningde (CN); Honggang Yu, Ningde (CN); Youlei Lai, Ningde (CN); Yanhui Li, Ningde (CN); Yu Dai, Ningde (CN); Jianping Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 694 days.

(21) Appl. No.: 18/119,832

(22) Filed: Mar. 10, 2023

(65) Prior Publication Data

US 2023/0246155 A1     Aug. 3, 2023

Related U.S. Application Data

(63) Continuation of application No. PCT/CN2021/134346, filed on Nov. 30, 2021.

(51) Int. Cl.
*H01M 4/04* (2006.01)
*H01M 4/02* (2006.01)
(Continued)

(52) U.S. Cl.
CPC ......... *H01M 4/0404* (2013.01); *H01M 4/622* (2013.01); *H01M 4/625* (2013.01); (Continued)

(58) Field of Classification Search
CPC .............................. H01M 4/0404; H01M 4/66
See application file for complete search history.

(56) References Cited

U.S. PATENT DOCUMENTS

2018/0183065 A1*  6/2018  Sasaki ............... H01M 10/0562
2022/0102698 A1    3/2022  Li et al.

FOREIGN PATENT DOCUMENTS

CN         111916874 A     11/2020
CN         112018326 A     12/2020
(Continued)

OTHER PUBLICATIONS

Furrer, D. U., & Semiatin, S. L. (2009). ASM Handbook. vol. 22a, fundamentals of modeling for Metals Processing. ASM International, p. 604-607 (Year: 2009).*
(Continued)

*Primary Examiner* — Barbara L Gilliam
*Assistant Examiner* — Benjamin T Lustgraaf
(74) *Attorney, Agent, or Firm* — XSENSUS LLP

(57) ABSTRACT

The present application provides a negative electrode plate, a secondary battery, a battery module, a battery pack, and a power consuming device. The negative electrode plate may include a main body region and at least one low-thermal-conductivity edge region; and the low-thermal-conductivity edge region and the main body region respectively may have thermal conductivities of $\lambda_2$ and $\lambda_1$, where $\lambda_2 < \lambda_1$.

20 Claims, 5 Drawing Sheets

(51) Int. Cl.
  H01M 4/62        (2006.01)
  H01M 50/204      (2021.01)
(52) U.S. Cl.
  CPC .... H01M 50/204 (2021.01); *H01M 2004/021*
      (2013.01); *H01M 2004/027* (2013.01)

(56)                References Cited

FOREIGN PATENT DOCUMENTS

| | | | |
|---|---|---|---|
| CN | 113471569 | A | 10/2021 |
| CN | 113594467 | A | 11/2021 |
| EP | 3913711 | A1 | 11/2021 |
| JP | 2010-212094 | A | 9/2010 |
| JP | 2013-020784 | A | 1/2013 |
| JP | 2016054132 | A * | 4/2016 |
| JP | 2018-081792 | A | 5/2018 |
| JP | 2019-016427 | A | 1/2019 |

OTHER PUBLICATIONS

Extended European Search Report issued Jul. 17, 2024 in European
Patent Application No. 21956260.0.
International Search Report and Written Opinion mailed on Aug. 31,
2022, received for PCT Application PCT/CN2021/134346, filed on
Nov. 30, 2021, 18 pages including English Translation.

* cited by examiner

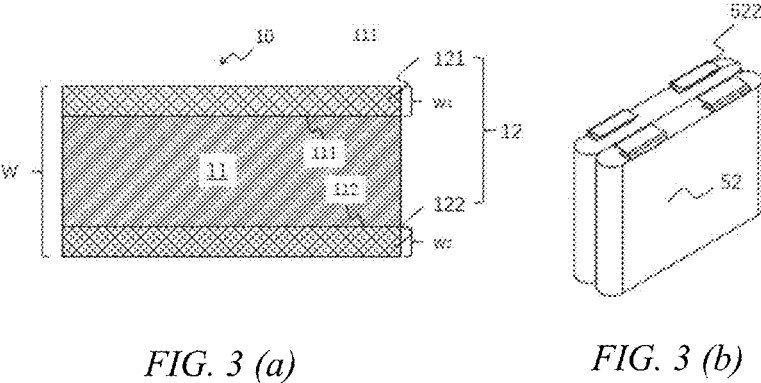
FIG. 3 (a)                    FIG. 3 (b)
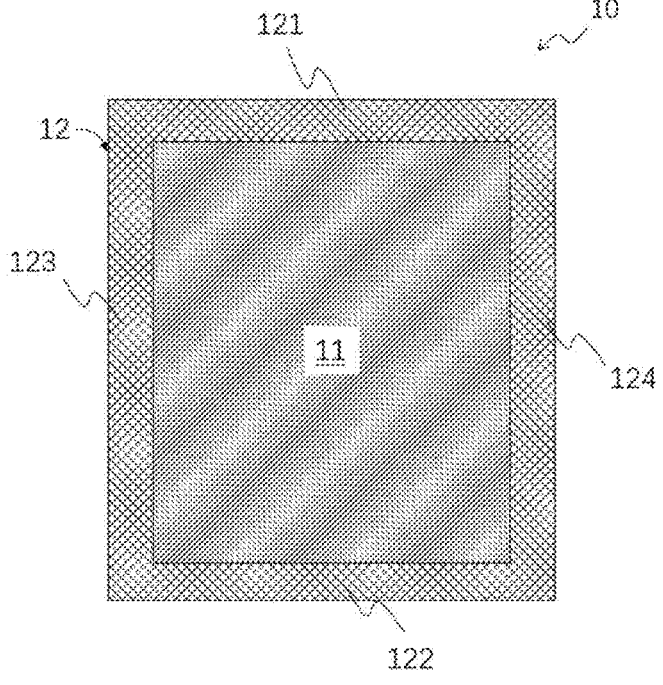
FIG. 4

NEGATIVE ELECTRODE PLATE, SECONDARY BATTERY, BATTERY MODULE, BATTERY PACK, AND POWER CONSUMING DEVICE

CROSS-REFERENCE TO RELATED APPLICATION

The present application is a continuation of International Application No. PCT/CN2021/134346, filed Nov. 30, 2021, which is incorporated herein by reference in its entirety.

TECHNICAL FIELD

The present application relates to the technical field of secondary batteries, and in particular, to a negative electrode plate, a secondary battery, a battery module, a battery pack, and a power consuming device.

BACKGROUND ART

In recent years, with the increasing application range, secondary batteries are widely used in energy storage power systems such as hydraulic power, thermal power, wind power and solar power stations, as well as many fields such as electric tools, electric bicycles, electric motorcycles, electric vehicles, military equipment, and aerospace. Due to the great development of the secondary batteries, higher requirements have also been placed on the secondary batteries in terms of energy density, cycling performance, safety performance, etc.

SUMMARY OF THE DISCLOSURE

The present application is implemented in view of the above problems, and an objective thereof is to provide a negative electrode plate, wherein the negative electrode plate comprises a main body region and at least one low-thermal-conductivity edge region; and the low-thermal-conductivity edge region and the main body region respectively have thermal conductivities of $\lambda_2$ and $\lambda_1$, where $\lambda_2 < \lambda_1$. The negative electrode plate based on this solution is used for a secondary battery, and a lithium precipitation state of the secondary battery, especially a lithium precipitation state in an edge region, is effectively improved.

In some embodiments, a ratio $\lambda_1/\lambda_2$ of $\lambda_1$ to $\lambda_2$ is 1.1-1.5:1. The negative electrode plate based on this solution is used for a secondary battery, and a lithium precipitation state of the secondary battery, especially a lithium precipitation state in an edge region, is further improved.

In some embodiments, $\lambda_1$ has a value of 300-400 W/(m·K). The negative electrode plate based on this solution is used for a secondary battery, and a lithium precipitation state of the secondary battery, especially a lithium precipitation state in an edge region, is further improved.

In some embodiments, $\lambda_2$ has a value of 200-300 W/(m·K). The negative electrode plate based on this solution is used for a secondary battery, and a lithium precipitation state of the secondary battery, especially a lithium precipitation state in an edge region, is further improved.

In some embodiments, the low-thermal-conductivity edge region and the main body region respectively have electrical conductivities of $\sigma_2$ and $\sigma_1$; the negative electrode plate meets a kinetic coefficient Q>0, and the kinetic coefficient Q is calculated by using the following formula:

$$Q = \frac{\lambda_2 - \lambda_1}{\lambda_2} - \frac{1.2(\sigma_2 - \sigma_1)}{\sigma_2};$$

optionally, the negative electrode plate meets a kinetic coefficient Q≥0.1. The negative electrode plate based on this solution is used for a secondary battery, and a lithium precipitation state of the secondary battery, especially a lithium precipitation state in an edge region, is further improved.

In some embodiments, a ratio $\sigma_1/\sigma_2$ of $\sigma_1$ to $\sigma_2$ is 1.3 or less, optionally 1-1.3:1. The negative electrode plate based on this solution is used for a secondary battery, and a lithium precipitation state of the secondary battery, especially a lithium precipitation state in an edge region, is further improved.

In some embodiments, $\sigma_1$ has a value of $5.3 \times 10^7$-$5.9 \times 10^7$ $\mu S \cdot cm^{-1}$. The negative electrode plate based on this solution is used for a secondary battery, and a lithium precipitation state of the secondary battery, especially a lithium precipitation state in an edge region, is further improved.

In some embodiments, $\sigma_2$ has a value of $5.0 \times 10^7$-$5.3 \times 10^7$ $\mu S \cdot cm^{-1}$. The negative electrode plate based on this solution is used for a secondary battery, and a lithium precipitation state of the secondary battery, especially a lithium precipitation state in an edge region, is further improved.

In some embodiments, the negative electrode plate comprises a current collector layer, the current collector layer belonging to the low-thermal-conductivity edge region and the current collector layer belonging to the main body region respectively have thermal conductivities of $\lambda_{21}$ and where $\lambda_{21} < \lambda_{11}$. The negative electrode plate based on this solution is used for a secondary battery, and a lithium precipitation state of the secondary battery, especially a lithium precipitation state in an edge region, is further improved.

In some embodiments, the negative electrode plate comprises an active material layer, the negative electrode active material layer belonging to the low-thermal-conductivity edge region and the negative electrode active material layer belonging to the main body region respectively have thermal conductivities of $\lambda_{23}$ and $\lambda_{13}$, where $\lambda_{23} < \lambda_{13}$. The negative electrode plate based on this solution is used for a secondary battery, and a lithium precipitation state of the secondary battery, especially a lithium precipitation state in an edge region, is further improved.

In some embodiments, the negative electrode plate comprises a current collector layer and an active material layer, wherein a priming coat belonging to the low-thermal-conductivity edge region is further provided between the current collector layer belonging to the low-thermal-conductivity edge region and the active material layer belonging to the low-thermal-conductivity edge region; and the active material layer belonging to the main body region is directly laminated on the current collector layer belonging to the main body region (that is, no priming coat is provided between the active material layer belonging to the main body region and the current collector layer belonging to the main body region). The negative electrode plate based on this solution is used for a secondary battery, and a lithium precipitation state of the secondary battery, especially a lithium precipitation state in an edge region, is further improved.

In some embodiments, the negative electrode plate comprises a current collector layer and an active material layer, wherein a priming coat belonging to the low-thermal-conductivity edge region is further provided between the current collector layer belonging to the low-thermal-conductivity edge region and the active material layer belonging to the low-thermal-conductivity edge region; and a priming coat belonging to the main body region is further provided between the current collector layer belonging to the main body region and the active material layer belonging to the low-thermal-conductivity edge region; and the priming coat belonging to the low-thermal-conductivity edge region and the priming coat belonging to the main body region respectively have thermal conductivities of $\lambda_{22}$ and $\lambda_{12}$, where $\lambda_{22} < \lambda_{12}$. The negative electrode plate based on this solution is used for a secondary battery, and a lithium precipitation state of the secondary battery, especially a lithium precipitation state in an edge region, is further improved.

In some embodiments, the priming coat belonging to the low-thermal-conductivity edge region comprises a thermal resistance material, the priming coat belonging to the main body region comprises conductive carbon black, and the thermal resistance material has a thermal conductivity less than that of the conductive carbon black. The negative electrode plate based on this solution is used for a secondary battery, and a lithium precipitation state of the secondary battery, especially a lithium precipitation state in an edge region, is further improved.

In some embodiments, the priming coat belonging to the main body region does not comprise the thermal resistance material. The negative electrode plate based on this solution is used for a secondary battery, and a lithium precipitation state of the secondary battery, especially a lithium precipitation state in an edge region, is further improved. In some embodiments, the priming coat belonging to the main body region comprises the thermal resistance material, but the content of the thermal resistance material in the priming coat belonging to the main body region is less than that in the priming coat belonging to the low-thermal-conductivity edge region. The negative electrode plate based on this solution is used for a secondary battery, and a lithium precipitation state of the secondary battery, especially a lithium precipitation state in an edge region, is further improved.

In some embodiments, the priming coat belonging to the low-thermal-conductivity edge region comprises the following components: 50 wt %-60 wt % of conductive carbon black; 5 wt %-15 wt % of thermal resistance material; and 30 wt %-40 wt % of binder. The negative electrode plate based on this solution is used for a secondary battery, and a lithium precipitation state of the secondary battery, especially a lithium precipitation state in an edge region, is further improved.

In some embodiments, the priming coat belonging to the main body region comprises the following components: 60 wt %-70 wt % of conductive carbon black; and 30 wt %-40 wt % of binder. The negative electrode plate based on this solution is used for a secondary battery, and a lithium precipitation state of the secondary battery, especially a lithium precipitation state in an edge region, is further improved.

In some embodiments, the thermal resistance material is selected from one or more of the following: gelatin, ammonium sulfate, ammonium chloride, thiourea, and copper chloride. The negative electrode plate based on this solution is used for a secondary battery, and a lithium precipitation state of the secondary battery, especially a lithium precipitation state in an edge region, is further improved.

In some embodiments, the negative electrode plate comprises a first low-thermal-conductivity edge region and/or a second low-thermal-conductivity edge region, and the main body region comprises a first long side and a second long side which are parallel to each other; the first low-thermal-conductivity edge region is located outside the first long side of the main body region; and the second low-thermal-conductivity edge region is located outside the second long side of the main body region. In this implementation solution, the main body region has a length-width ratio greater than 1, e.g., a length-width ratio greater than 2.

In some embodiments, an outer side of the low-thermal-conductivity edge region is next to an edge of the negative electrode plate. The negative electrode plate based on this solution is used for a secondary battery, and a lithium precipitation state of the secondary battery, especially a lithium precipitation state in an edge region, is further improved.

In some embodiments, a distance between an inner side of the low-thermal-conductivity edge region and an edge of the negative electrode plate is w, the negative electrode plate has a width of W, and a ratio W/w of W to w is equal to 11.5-21.9:1. The negative electrode plate based on this solution is used for a secondary battery, and a lithium precipitation state of the secondary battery, especially a lithium precipitation state in an edge region, is further improved.

In some embodiments, w=8-15 mm. The negative electrode plate based on this solution is used for a secondary battery, and a lithium precipitation state of the secondary battery, especially a lithium precipitation state in an edge region, is further improved.

In some embodiments, W=100-200 mm. The negative electrode plate based on this solution is used for a secondary battery, and a lithium precipitation state of the secondary battery, especially a lithium precipitation state in an edge region, is further improved. In some embodiments, an outer side of one or more sides of the main body region is provided with a low-thermal-conductivity edge region. The negative electrode plate based on this solution is used for a secondary battery, and a lithium precipitation state of the secondary battery, especially a lithium precipitation state in an edge region, is further improved.

In some embodiments, an area of the main body region accounts for 78.1%-88.5% of a unilateral area of the negative electrode plate. The negative electrode plate based on this solution is used for a secondary battery, and a lithium precipitation state of the secondary battery, especially a lithium precipitation state in an edge region, is further improved.

In some embodiments, an area of the low-thermal-conductivity edge region accounts for 11.5%-21.9% of the unilateral area of the negative electrode plate. The negative electrode plate based on this solution is used for a secondary battery, and a lithium precipitation state of the secondary battery, especially a lithium precipitation state in an edge region, is further improved.

In some embodiments, a ratio of the area of the main body region to the area of the low-thermal-conductivity edge region is 3.6-7.7:1. The negative electrode plate based on this solution is used for a secondary battery, and a lithium precipitation state of the secondary battery, especially a lithium precipitation state in an edge region, is further improved.

An embodiment of the present application provides a secondary battery, comprising an electrode assembly, wherein the electrode assembly comprises the negative electrode plate according to any one of the above embodiments.

An embodiment of the present application provides a battery module, comprising the secondary battery according to any one of the above embodiments.

An embodiment of the present application provides a battery pack, comprising the battery module according to any one of the above embodiments.

An embodiment of the present application provides a power consuming device, comprising at least one selected from the secondary battery according to any one of the above embodiments, the battery module according to any one of the above embodiments or the battery pack according to any one of the above embodiments.

Beneficial Effects

One or more implementation solutions of the present application have one or more of the following beneficial effects:

(1) the negative electrode plate is used for a secondary battery, and a lithium precipitation state of the secondary battery, especially a lithium precipitation state in an edge region, is improved;

(2) mechanical properties of the negative electrode plate, especially an elongation thereof, are improved.

BRIEF DESCRIPTION OF THE DRAWINGS

FIG. 3(a) shows a negative electrode plate according to another embodiment of the present application, and FIG. 3(b) shows an electrode assembly according to another embodiment of the present application.

FIG. 4 shows a negative electrode plate according to another embodiment of the present application.

LIST OF REFERENCE NUMERALS

Figure 1:
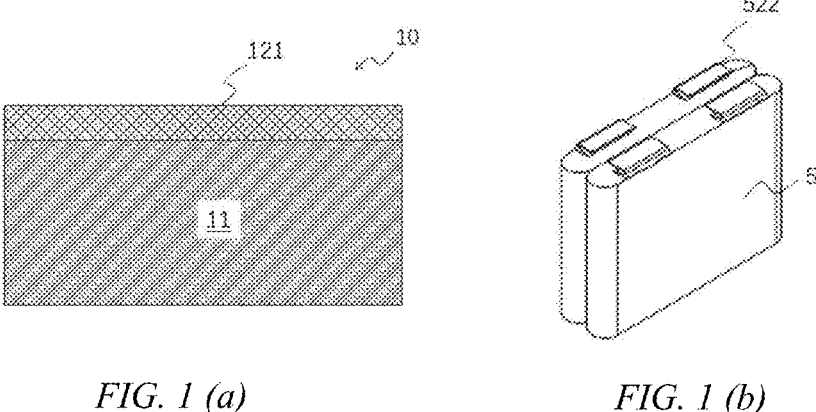
FIG. 1(a) shows a negative electrode plate according to an embodiment of the present application.
FIG. 1(b) shows an electrode assembly according to an embodiment of the present application.

Negative electrode plate 10; Main body region 11; Low-thermal-conductivity edge region 12; First low-thermal-conductivity edge region 121; Second low-thermal-conductivity edge region 122; Third low-thermal-conductivity edge region 123; Fourth low-thermal-conductivity edge region 124; First long side 111; Second long side 112; Active material layer 22; Priming coat 24; Current collector layer 26;

Battery pack 1; Upper case body 2; Lower case body 3; Battery module 4; Secondary battery 5; Housing 51; Electrode assembly 52; Tab 522; Top cover assembly 53.

DETAILED DESCRIPTION OF EMBODIMENTS

Hereinafter, embodiments of a positive electrode active material and a preparation method therefor, a positive electrode plate, a negative electrode plate, a secondary battery, a battery module, a battery pack, and a power consuming device of the present application are described in detail and specifically disclosed with reference to the accompanying drawings as appropriate. However, unnecessary detailed illustrations may be omitted in some instances. For example, there are situations where detailed description of well-known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in the claims.

"Ranges" disclosed in the present application are defined in the form of lower and upper limits, and a given range is defined by the selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. In addition, if minimum range values 1 and 2 are listed, and maximum range values 3, 4, and 5 are listed, the following ranges are all contemplated: 1-3, 1-4, 1-5, 2-3, 2-4, and 2-5. In the present application, unless stated otherwise, the numerical range "a-b" denotes an abbreviated representation of any combination of real numbers between a and b, where both a and b are real numbers. For example, the numerical range "0-5" means that all real numbers between "0-5" have been listed herein, and "0-5" is just an abbreviated representation of combinations of these numerical values. In addition, when a parameter is expressed as an integer of ≥2, it is equivalent to disclosing that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated. All technical features and optional technical features of the present application can be combined with one another to form a new technical solution, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), and also steps (c), (a) and (b), etc.

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise stated. For example, the phrase "A or B" means "A, B, or both A and B". More specifically, a condition "A or B" is satisfied by any one of the following: A is true (or present) and B is false (or not present); A is false (or not present) and B is true (or present); or both A and B are true (or present).

[Secondary Battery]

A secondary battery, also known as a rechargeable battery or an accumulator, refers to a battery of which active materials can be activated by means of charging for reuse of the battery after the battery is discharged.

Generally, the secondary battery comprises a positive electrode plate, a negative electrode plate, a separator and an electrolyte. During a charge/discharge process of the battery, active ions (e.g., lithium ions) are intercalated and de-intercalated back and forth between the positive electrode plate and the negative electrode plate. The separator is provided between the positive electrode plate and the negative electrode plate, and mainly prevents positive and negative electrodes from short-circuiting and enables the active ions to pass through. The electrolyte is provided between the positive electrode plate and the negative electrode plate and mainly functions for active ion conduction.

[Positive Electrode Plate]

The positive electrode plate comprises a positive electrode current collector and a positive electrode active material layer provided on at least one surface of the positive electrode current collector, wherein the positive electrode active material layer comprises a positive electrode active material.

As an example, the positive electrode current collector has two surfaces opposite in its own thickness direction, and the positive electrode active material layer is provided on either or both of the two opposite surfaces of the positive electrode current collector.

In some embodiments, the positive electrode current collector can be a metal foil or a composite current collector. For example, as a metal foil, an aluminum foil can be used. The composite current collector may comprise a polymer material substrate and a metal layer formed on at least one surface of the polymer material substrate. The composite current collector can be formed by forming a metal material (aluminum, an aluminum alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the positive electrode active material can be a positive electrode active material known in the art for batteries. As an example, the positive electrode active material may include at least one of the following materials: lithium-containing phosphates of an olivine structure, lithium transition metal oxides and their respective modified compounds. However, the present application is not limited to these materials, and other conventional materials that can be used as positive electrode active materials for batteries may also be used. These positive electrode active materials may be used alone or in combination of two or more. Herein, examples of lithium transition metal oxides may include, but are not limited to, at least one of lithium cobalt oxide (e.g.

$LiCoO_2$), lithium nickel oxide (e.g. $LiNiO_2$), lithium manganese oxide (e.g. $LiMnO_2$, $LiMn_2O_4$), lithium nickel cobalt oxide, lithium manganese cobalt oxide, lithium nickel manganese oxide, lithium nickel cobalt manganese oxide (e.g. $LiNi_{1/3}Co_{0.3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$)), lithium nickel cobalt aluminum oxide (e.g. $LiNi_{0.85}Co_{0.15}Al_{0.05}O_2$), and modified compounds thereof, and the like. Examples of lithium-containing phosphates of olivine structure may include, but are not limited to, at least one of lithium iron phosphate (e.g. $LiFePO_4$ (also referred to as LFP)), lithium iron phosphate and carbon composites, lithium manganese phosphate (e.g. $LiMnPO_4$), lithium manganese phosphate and carbon composites, lithium iron manganese phosphate, and lithium iron manganese phosphate and carbon composites.

In some embodiments, the positive electrode active material layer also optionally comprises a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode active material layer also optionally comprises a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode plate can be prepared as follows: the above-mentioned components for preparing the positive electrode plate, such as the positive electrode active material, the conductive agent, the binder and any other components, are dispersed in a solvent (e.g. N-methylpyrrolidone) to form a positive electrode slurry; and the positive electrode slurry is coated onto a positive electrode current collector, and is then subjected to procedures such as drying and cold pressing, so as to obtain the positive electrode plate.

[Negative Electrode Plate]

FIG. 1(a) shows a negative electrode plate according to an embodiment of the present application.

Referring to FIG. 1(a), in some embodiments, the present application provides a negative electrode plate 10. The negative electrode plate 10 comprises a main body region 11 and a first low-thermal-conductivity edge region 121. The first low-thermal-conductivity edge region 121 and the main body region 11 respectively have thermal conductivities of $\lambda_{2a}$ and $\lambda_1$, where $\lambda_{2a} < \lambda_1$. The negative electrode plate based on this solution is used for a secondary battery, and a lithium precipitation state of the secondary battery, especially a lithium precipitation state in an edge region, is effectively improved.

Referring to FIG. 1(a), in some embodiments, the first low-thermal-conductivity edge region 121 is located on a side of the main body region 11.

FIG. 1(b) shows an electrode assembly according to an embodiment of the present application.

Referring to FIG. 1(b), in some embodiments, an electrode assembly 52 comprises a wound core obtained by laminating and winding a negative electrode plate 10, a separator, and a positive electrode plate. The electrode assembly 52 further comprises a tab 522 mounted on a side of the negative electrode plate. In this embodiment, the first low-thermal-conductivity edge region 121 is located on a side of the main body region 11 close to the tab 522. The electrode assembly based on this solution is used for a secondary battery, and a lithium precipitation state of the secondary battery, especially a lithium precipitation state in an edge region, is effectively improved.

Figure 2:
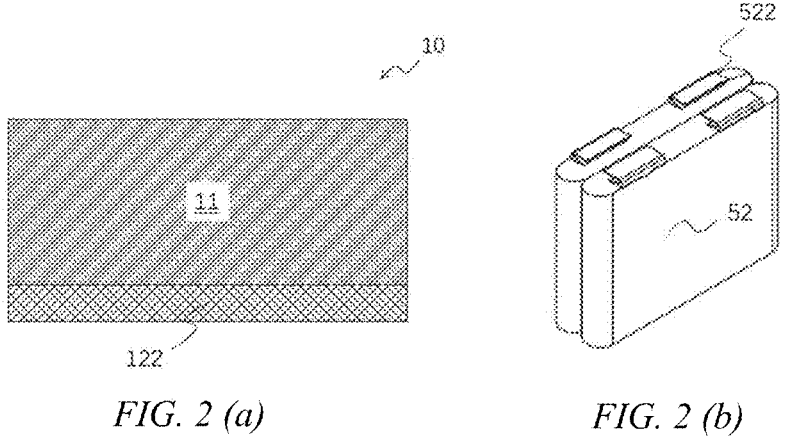
FIG. 2(a) shows a negative electrode plate according to another embodiment of the present application.
FIG. 2(b) shows an electrode assembly according to another embodiment of the present application.

FIG. 2($a$) shows a negative electrode plate according to an embodiment of the present application.

Referring to FIG. 2($a$), in some embodiments, the present application provides a negative electrode plate 10. The negative electrode plate 10 comprises a main body region 11 and a second low-thermal-conductivity edge region 122. The second low-thermal-conductivity edge region 122 and the main body region 11 respectively have thermal conductivities of $\lambda_{2b}$ and $\lambda_1$, where $\lambda_{2b} < \lambda_1$. The negative electrode plate based on this solution is used for a secondary battery, and a lithium precipitation state of the secondary battery, especially a lithium precipitation state in an edge region, is effectively improved.

Referring to FIG. 2($a$), in some embodiments, the second low-thermal-conductivity edge region 122 is located on a side of the main body region 11.

FIG. 2($b$) shows an electrode assembly according to an embodiment of the present application.

Referring to FIG. 2($b$), in some embodiments, an electrode assembly 52 comprises a tab 522. The electrode assembly 52 comprises a wound core obtained by laminating and winding a negative electrode plate 10, a separator, and a positive electrode plate. The electrode assembly 52 further comprises a tab 522 mounted on a side of the negative electrode plate. In this embodiment, the second low-thermal-conductivity edge region 122 is located on a side of the main body region 11 away from the tab 522.

FIG. 3($a$) shows a negative electrode plate according to an embodiment of the present application.

Referring to FIG. 3($a$), in some embodiments, the negative electrode plate 10 comprises a main body region 11 and a low-thermal-conductivity edge region 12. The low-thermal-conductivity edge region 12 and the main body region 11 respectively have thermal conductivities of $\lambda_2$ and $\lambda_1$, where $\lambda_2 < \lambda_1$.

Referring to FIG. 3($a$), in some embodiments, the low-thermal-conductivity edge region 12 comprises a first low-thermal-conductivity edge region 121 and a second low-thermal-conductivity edge region 122. The first low-thermal-conductivity edge region 121 and the second low-thermal-conductivity edge region 122 are respectively located on two sides of the main body region 11. The first low-thermal-conductivity edge region 121, the second low-thermal-conductivity edge region 122, and the main body region 11 respectively have thermal conductivities of $\lambda_{2a}$, $\lambda_{2b}$, and $\lambda_1$, where $\lambda_{2a} < \lambda_1$, and $\lambda_{2b} < \lambda_1$.

FIG. 3($b$) shows an electrode assembly according to an embodiment of the present application.

Referring to FIG. 3($b$), in some embodiments, an electrode assembly 52 comprises a wound core obtained by laminating and winding a negative electrode plate 10, a separator, and a positive electrode plate. The electrode assembly 52 further comprises a tab 522 mounted on a side of the negative electrode plate. In this embodiment, the first low-thermal-conductivity edge region 121 is located on a side of the main body region 11 close to the tab 522, and the second low-thermal-conductivity edge region 122 is located on a side of the main body region 11 away from the tab 522.

In the present application, the main body region 11 and at least one low-thermal-conductivity edge region 12 are provided on the negative electrode plate 10, the thermal conductivities of the low-thermal-conductivity edge region 12 and the main body region 11 are respectively controlled to be $\lambda_2$ and $\lambda_1$, where $\lambda_2 < \lambda_1$. The negative electrode plate is used for a secondary battery, and a lithium precipitation state of the secondary battery, especially a lithium precipitation state in an edge region, is significantly improved. The reasoning is that the thermal conductivity of the low-thermal-conductivity edge region is different from that of the main body region (the former is less than the latter), and the temperature of the low-thermal-conductivity edge region is higher than that of the main body region during battery operation, so that dynamic performance of the low-thermal-conductivity edge region is greater than that of the main body region, thereby improving a lithium precipitation window of a negative electrode, suppressing lithium precipitation at an edge of the electrode plate, and improving battery cycling stability and safety. Without being limited by theory, the negative electrode plate according to the present application is used for a secondary battery, and a lithium precipitation state of the secondary battery, especially a lithium precipitation state in an edge region, is effectively improved. The reasoning may be as follows:

in the present application, it has been found that when a secondary battery (such as a lithium ion battery) is charged, $Li^+$ is deintercalated from the positive electrode, and the $Li^+$ diffuses to a negative electrode surface in the electrolyte and is intercalated in a negative electrode material. However, due to obstruction of ohmic resistance and a charge transfer and diffusion process, some $Li^+$ cannot be smoothly inserted into the negative electrode material, so that a side reaction of lithium deposition, i.e., lithium precipitation, occurs on the surface of the negative electrode plate. In the present application, it has been further found that a gap is prone to occurring at a position of the negative electrode plate close to the edge due to a winding process. This leads to preferential deposition of lithium on the edge of the negative electrode.

Based on the above findings of the present application, in the present application, the low-thermal-conductivity edge region is creatively provided at the edge of the negative electrode plate. Because the low-thermal-conductivity edge region has a relatively low thermal conductivity, during operation of the secondary battery, the low-thermal-conductivity edge region has a higher temperature. This increases a diffusion and intercalation rate of $Li^+$ in the low-thermal-conductivity edge region, thereby improving the lithium precipitation state in the negative electrode edge region and further improving operation performance of the secondary battery.

In some embodiments, in the term "low-thermal-conductivity edge region", the term "low-thermal-conductivity" means that the edge region has a thermal conductivity less than that of the main body region, that is, the ratio of the thermal conductivity of the edge region to the thermal conductivity of the main body region is less than 1. The term "low-thermal-conductivity" does not indicate or imply a specific value which the thermal conductivity of the edge region must reach.

Referring to FIGS. 1-3, in some embodiments, the main body region 11 is a region near the center of the negative electrode plate 10, and the low-thermal-conductivity edge region refers to a region located outside the main body region 11 and having a thermal conductivity less than that of the main body region 11.

In some embodiments, unless otherwise stated, the term "edge region" and the term "low-thermal-conductivity edge region" are used interchangeably.

In some embodiments, the thermal conductivity is obtained through testing based on "ISO 22007-2:2008 Determination of Thermal Conductivity of Material by Transient Plane Heat Source Method". The unit of a thermal conductivity may be W/(m·K). A direction in which a thermal conductivity is measured is optionally a face direction (i.e., normal direction) perpendicular to the negative electrode plate.

In some embodiments, a ratio $\lambda_1/\lambda_2$ of the thermal conductivity $\lambda_1$ to $\lambda_2$ is 1.1-1.5:1, optionally 1.2-1.4:1, e.g., 1-1.1:1, 1.1-1.2:1, 1.2-1.3:1, 1.3-1.4:1, and 1.4-1.5:1. The negative electrode plate based on this solution is used for a secondary battery, and a lithium precipitation state of the secondary battery, especially a lithium precipitation state in an edge region, is further improved.

In some embodiments, the thermal conductivity $\lambda_1$ has a value of 300-400 W/(m·K), such as 300-320 W/(m·K), 320-340 W/(m·K), 340-360 W/(m·K), 360-380 W/(m·K) or 380-400 W/(m·K). The negative electrode plate based on this solution is used for a secondary battery, and a lithium precipitation state of the secondary battery, especially a lithium precipitation state in an edge region, is further improved.

In some embodiments, the thermal conductivity $\lambda_2$ has a value of 200-300 W/(m·K), such as 200-220 W/(m·K), 220-240 W/(m·K), 240-260 W/(m·K), 260-280 W/(m·K) or 280-300 W/(m·K). The negative electrode plate based on this solution is used for a secondary battery, and a lithium precipitation state of the secondary battery, especially a lithium precipitation state in an edge region, is further improved.

It should be understood that the value ranges of $\lambda_2$ and $\lambda_1$ may overlap, as long as $\lambda_2 < \lambda_1$ is met.

In some embodiments, the low-thermal-conductivity edge region 12 and the main body region 11 respectively have electrical conductivities of $\sigma_2$ and $\sigma_1$; the negative electrode plate 10 meets a kinetic coefficient Q>0, and the kinetic coefficient Q is calculated by using the following formula:

$$Q = \frac{\lambda_2 - \lambda_1}{\lambda_2} - \frac{1.2(\sigma_2 - \sigma_1)}{\sigma_2};$$

optionally, the negative electrode plate 10 meets a kinetic coefficient Q≥0.1. The negative electrode plate based on this solution is used for a secondary battery, and a lithium precipitation state of the secondary battery, especially a lithium precipitation state in an edge region, is further improved.

In some embodiments, the electrical conductivity is obtained through testing with reference to the standard "GB/T 11007-2008 Test Method of Electrical Conductivity Analyzers". The unit of the electrical conductivity may be $\mu \cdot S\ cm^{-1}$. A direction in which the electrical conductivity is measured may be optionally parallel to the negative electrode plate.

In some embodiments, a ratio $\sigma_1/\sigma_2$ of the electrical conductivity $\sigma_1$ to $\sigma_2$ is 1.3 or less; optionally, $\sigma_1/\sigma_2$ is 1-1.3:1; and optionally, $\sigma_1/\sigma_2$ is 1.1-1.2:1. The negative electrode plate based on this solution is used for a secondary battery, and a lithium precipitation state of the secondary battery, especially a lithium precipitation state in an edge region, is further improved.

In some embodiments, the electrical conductivity $\sigma_1$ has a value of $5.3 \times 10^7$-$5.9 \times 10^7\ \mu S \cdot cm^{-1}$, such as 5.3-5.5 $\mu S \cdot cm^{-1}$, 5.5-5.7 $\mu S \cdot cm^{-1}$, and 5.7-5.9 $\mu S \cdot cm^{-1}$. The negative electrode plate based on this solution is used for a secondary battery, and a lithium precipitation state of the secondary battery, especially a lithium precipitation state in an edge region, is further improved.

In some embodiments, the electrical conductivity $\sigma_2$ has a value of $5.0 \times 10^7$-$5.3 \times 10^7\ \mu S \cdot cm^{-1}$, such as 5.1-5.2 $\mu S \cdot cm^{-1}$. The negative electrode plate based on this solution is used for a secondary battery, and a lithium precipitation state of the secondary battery, especially a lithium precipitation state in an edge region, is further improved.

Referring to FIG. 3(a), in some embodiments, the negative electrode plate 10 has a length direction L and a width direction D, and a dimension of the negative electrode plate 10 in the length direction L is greater than that in the width direction D. The main body region 11 and the low-thermal-conductivity edge region 12 extend in the length direction L of the negative electrode plate 10. A distance between an inner side of the low-thermal-conductivity edge region 12 and an edge of the negative electrode plate 10 is w, the negative electrode plate has a width of W, and a ratio W/w of W to w is equal to 11.5-21.9:1.

Referring to FIG. 3, in some embodiments, the main body region 11 comprises a first long side 111 and a second long side 112 which are parallel to each other, the negative electrode plate 10 comprises a first low-thermal-conductivity edge region 121 and/or a second low-thermal-conductivity edge region 122, and the first low-thermal-conductivity edge region 121 is located outside the first long side of the main body region 11; and the second low-thermal-conductivity edge region 122 is located outside the second long side of the main body region 11. The negative electrode plate based on this solution is used for a secondary battery, and a lithium precipitation state of the secondary battery, especially a lithium precipitation state in an edge region, is further improved.

Referring to FIG. 3, in some embodiments, an outer side of the low-thermal-conductivity edge region 12 is next to an edge of the negative electrode plate 10. The negative electrode plate based on this solution is used for a secondary battery, and a lithium precipitation state of the secondary battery, especially a lithium precipitation state in an edge region, is further improved.

In some embodiments, the term "next to" includes that the outer side of the low-thermal-conductivity edge region completely coincides with the edge of the negative electrode plate 10, or there is a distance of only 5 mm or less (e.g., 3 mm or less) between the outer side of the low-thermal-conductivity edge region and the edge of the negative electrode plate.

Referring to FIG. 3, in some embodiments, a distance between an inner side of the low-thermal-conductivity edge region 12 and an edge of the negative electrode plate 10 is w (distances between inner sides of two low-thermal-conductivity edge regions and the edge of the negative electrode plate 10 are w1 and w2 respectively), the negative electrode plate 10 has a width of W, and a ratio W/w of W to w is equal to 11.5-21.9:1, e.g., W/w=11.5-13.5:1, 13.5-15.5:1, 15.5-17.5:1, 17.5-19.5:1 or 19.5-21.5:1. The negative electrode plate based on this solution is used for a secondary battery, and a lithium precipitation state of the secondary battery, especially a lithium precipitation state in an edge region, is further improved.

Referring to FIG. 3, in some embodiments, w=8-15 mm, e.g., w=10-12 mm. The negative electrode plate based on this solution is used for a secondary battery, and a lithium precipitation state of the secondary battery, especially a lithium precipitation state in an edge region, is further improved.

Referring to FIG. 3, in some embodiments, W=100-200 mm, e.g., W=100-120 mm, 120-140 mm, 140-160 mm, 160-180 mm or 180-200 mm. The negative electrode plate based on this solution is used for a secondary battery, and a lithium precipitation state of the secondary battery, especially a lithium precipitation state in an edge region, is further improved.

Referring to FIG. 3, in some embodiments, an area of the main body region 11 accounts for 78.1%-88.5% of a unilateral area of the negative electrode plate 10, e.g., 78.1%-80.1%, 80.1%-82.1%, 82.1%-84.1%, 84.1%-86.1%, or 86.1%-88.1%. The negative electrode plate based on this solution is used for a secondary battery, and a lithium precipitation state of the secondary battery, especially a lithium precipitation state in an edge region, is further improved.

Referring to FIG. 3, in some embodiments, an area of the low-thermal-conductivity edge region 12 accounts for 11.5%-21.9% of the unilateral area of the negative electrode plate 10, e.g., 11.5%-13.5%, 13.5%-15.5%, 15.5%-17.5%, 17.5%-19.5% or 19.5%-21.5%. The negative electrode plate based on this solution is used for a secondary battery, and a lithium precipitation state of the secondary battery, especially a lithium precipitation state in an edge region, is further improved.

Referring to FIG. 3, in some embodiments, a ratio of the area of the main body region 11 to the area of the low-thermal-conductivity edge region 12 is 3.6-7.7:1, e.g., 3.6-4.6:1, 4.6-5.6:1, 5.6-6.6:1 or 6.6-7.6:1. The negative electrode plate based on this solution is used for a secondary battery, and a lithium precipitation state of the secondary battery, especially a lithium precipitation state in an edge region, is further improved. FIG. 4 shows a negative electrode plate according to some embodiments of the present application.

Referring to FIG. 4, in some embodiments, an outer side of one or more sides of the main body region 11 is provided with a low-thermal-conductivity edge region 12. The negative electrode plate based on this solution is used for a secondary battery, and a lithium precipitation state of the secondary battery, especially a lithium precipitation state in an edge region, is further improved.

Referring to FIG. 4, in some embodiments, the negative electrode plate 10 comprises a main body region 11 and a plurality of low-thermal-conductivity edge regions 12. The main body region 11 has a quadrangular shape. Outer sides of four sides of the main body region 11 are respectively provided with edge regions 12, which are sequentially a first low-thermal-conductivity edge region 121, a second low-thermal-conductivity edge region 122, a third low-thermal-conductivity edge region 123, and a fourth low-thermal-conductivity edge region 124.

Figure 5:
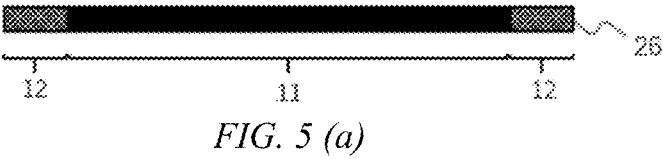
FIGS. 5(a)-(d) show schematic diagrams of a cross section of a negative electrode plate according to some embodiments of the present application.
Figure 5:
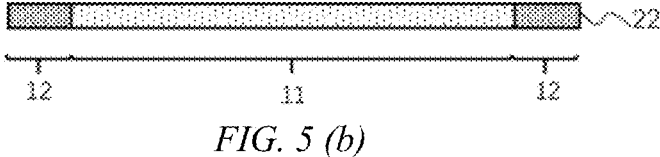
Figure 5:
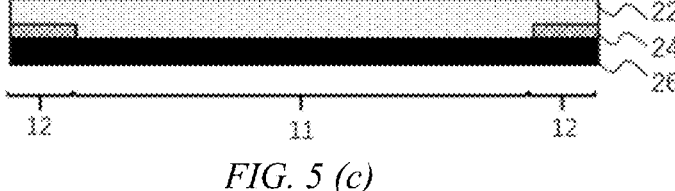
Figure 5:
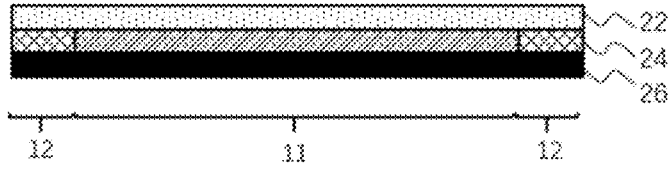

FIGS. 5(*a*)-(*d*) show a negative electrode plate according to some embodiments of the present application.

Referring to FIG. 5(*a*), an embodiment of the present application provides a negative electrode plate 10, wherein the negative electrode plate 10 comprises a main body region 11 and at least one low-thermal-conductivity edge region 12; the low-thermal-conductivity edge region 12 and the main body region 11 respectively have thermal conductivities of $\lambda_2$ and $\lambda_1$, where $\lambda_2 < \lambda_1$.

FIGS. 5(*a*)-(*d*) show cross-sectional diagrams of a negative electrode plate 10 according to some embodiments.

Referring to FIG. 5(*a*), in some embodiments, the negative electrode plate 10 comprises a current collector layer 26, the current collector layer 26 belonging to the low-thermal-conductivity edge region 12 and the current collector layer 26 belonging to the main body region 11 respectively have thermal conductivities of $\lambda_{21}$ and $\lambda_{11}$, where $\lambda_{21} < \lambda_{11}$. The negative electrode plate based on this solution is used for a secondary battery, and a lithium precipitation state of the secondary battery, especially a lithium precipitation state in an edge region, is further improved. The negative electrode plate 10 may further comprise an active material layer laminated with the current collector layer 26.

Referring to FIG. 5(*b*), in some embodiments, the negative electrode plate 10 comprises an active material layer 22, and the negative electrode active material layer 22 belonging to the low-thermal-conductivity edge region 12 and the negative electrode active material layer 22 belonging to the main body region 11 respectively have thermal conductivities of $\lambda_{23}$ and $\lambda_{13}$, where $\lambda_{23} < \lambda_{13}$. The negative electrode plate based on this solution is used for a secondary battery, and a lithium precipitation state of the secondary battery, especially a lithium precipitation state in an edge region, is further improved. The negative electrode plate 10 may further comprise a current collector layer laminated with the active material layer.

Referring to FIG. 5(*c*), in some embodiments, the negative electrode plate 10 comprises a current collector layer 26 and an active material layer 22, wherein a priming coat 24 belonging to the low-thermal-conductivity edge region 12 is further provided between the current collector layer 26 belonging to the low-thermal-conductivity edge region 12 and the active material layer 22 belonging to the low-thermal-conductivity edge region 12; and the active material layer 22 belonging to the main body region 11 is directly laminated on the current collector layer 26 belonging to the main body region 11 (that is, no priming coat 24 is provided between the active material layer belonging to the main body region and the current collector layer belonging to the main body region). The negative electrode plate based on this solution is used for a secondary battery, and a lithium precipitation state of the secondary battery, especially a lithium precipitation state in an edge region, is further improved.

Referring to FIG. 5(*d*), in some embodiments, the negative electrode plate 10 comprises a current collector layer 26 and an active material layer 22, wherein a priming coat 24 belonging to the low-thermal-conductivity edge region 12 is further provided between the current collector layer 26 belonging to the low-thermal-conductivity edge region 12 and the active material layer 22 belonging to the low-thermal-conductivity edge region 12; a priming coat 24 belonging to the main body region 11 is further provided between the current collector layer 26 belonging to the main body region 11 and the active material layer 22 belonging to the low-thermal-conductivity edge region 12; and the priming coat 24 belonging to the low-thermal-conductivity edge region 12 and the priming coat 24 belonging to the main body region 11 respectively have thermal conductivities of $\lambda_{22}$ and $\lambda_{12}$, where $\lambda_{22} < \lambda_{12}$. The negative electrode plate based on this solution is used for a secondary battery, and a lithium precipitation state of the secondary battery, especially a lithium precipitation state in an edge region, is further improved.

Referring to FIG. 5, in some embodiments, the priming coat 24 belonging to the low-thermal-conductivity edge region 12 comprises a thermal resistance material, the priming coat 24 belonging to the main body region 11 comprises conductive carbon black, and the thermal resistance material has a thermal conductivity less than that of the conductive carbon black. The negative electrode plate based on this solution is used for a secondary battery, and a lithium precipitation state of the secondary battery, especially a lithium precipitation state in an edge region, is further improved.

Referring to FIG. 5, in some embodiments, the priming coat 24 belonging to the main body region 11 does not comprise the thermal resistance material. The negative electrode plate based on this solution is used for a secondary battery, and a lithium precipitation state of the secondary battery, especially a lithium precipitation state in an edge region, is further improved.

Referring to FIG. 5, in some embodiments, the priming coat 24 belonging to the main body region 11 comprises the thermal resistance material, but the content of the thermal resistance material in the priming coat 24 belonging to the main body region 11 is less than that in the priming coat 24 belonging to the low-thermal-conductivity edge region 12. The negative electrode plate based on this solution is used for a secondary battery, and a lithium precipitation state of the secondary battery, especially a lithium precipitation state in an edge region, is further improved.

Referring to FIG. 5, in some embodiments, the priming coat 24 belonging to the low-thermal-conductivity edge region 12 comprises the following components: 50 wt %-60 wt % (e.g., 53 wt %-55 wt %) of conductive carbon black; 5 wt %-15 wt % (e.g., 8 wt %-12 wt %, e.g. 10 wt %) of thermal resistance material; and 30 wt %-40 wt % (e.g., 31 wt %-34 wt %) of binder. The negative electrode plate based on this solution is used for a secondary battery, and a lithium precipitation state of the secondary battery, especially a lithium precipitation state in an edge region, is further improved.

Referring to FIG. 5, in some embodiments, the binder in the priming coat 24 belonging to the low-thermal-conductivity edge region 12 is styrene butadiene rubber.

Referring to FIG. 5, in some embodiments, the priming coat 24 belonging to the low-thermal-conductivity edge region 12 further comprises 0.01 wt %-0.1 wt % of dispersant. Optionally, the dispersant is carboxymethyl cellulose.

Referring to FIG. 5, in some embodiments, the priming coat 24 belonging to the main body region 11 comprises the following components: 60 wt %-70 wt % of conductive carbon black; and 30 wt %-40 wt % of binder. The negative electrode plate based on this solution is used for a secondary battery, and a lithium precipitation state of the secondary battery, especially a lithium precipitation state in an edge region, is further improved.

Referring to FIG. 5, in some embodiments, the binder in the priming coat 24 belonging to the main body region 11 is styrene butadiene rubber.

Referring to FIG. 5, in some embodiments, the priming coat 24 belonging to the main body region 11 further comprises 0.01 wt %-0.1 wt % of dispersant. Optionally, the dispersant is carboxymethyl cellulose.

In some embodiments, the thermal resistance material is selected from one or more of the following: gelatin, ammonium sulfate, ammonium chloride, thiourea, and copper chloride. The negative electrode plate based on this solution is used for a secondary battery, and a lithium precipitation state of the secondary battery, especially a lithium precipitation state in an edge region, is further improved.

Referring to FIG. 5(*b*), in some embodiments, the negative electrode plate is a negative electrode without a current collector.

The negative electrode plate comprises a negative electrode current collector and a negative electrode active material layer provided on at least one surface of the negative electrode current collector, the negative electrode active material layer comprising a negative electrode active material.

As an example, the negative electrode current collector has two opposite surfaces in its own thickness direction, and the negative electrode active material layer is provided on either or both of the two opposite surfaces of the negative electrode current collector.

In some embodiments, the negative electrode current collector may be a metal foil or a composite current collector. For example, as a metal foil, a copper foil can be used. The composite current collector may comprise a polymer material substrate and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative electrode active material can be a negative electrode active material known in the art for batteries. As an example, the negative electrode active material may include at least one of the following materials: artificial graphite, natural graphite, soft carbon, hard carbon, a silicon-based material, a tin-based material and lithium titanate, etc. The silicon-based material may be selected from at least one of elemental silicon, silicon oxides, silicon carbon composites, silicon nitrogen composites and silicon alloys. The tin-based material may be selected from at least one of elemental tin, tin oxides, and tin alloys. However, the present application is not limited to these materials, and other conventional materials that can be used as negative electrode active materials for batteries can also be used. These negative electrode active materials may be used alone or in combination of two or more.

In some embodiments, the negative electrode active material layer also optionally comprises a binder. As an example, the binder may be selected from at least one of a styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode active material layer also optionally comprises a conductive agent. As an example, the conductive agent may be selected from at least one of superconductive carbon, acetylene black, carbon black, ketjenblack, carbon dots, carbon nanotubes, graphene, and carbon nanofibers.

In some embodiments, the negative electrode active material layer also optionally comprises other auxiliary agents, e.g., a thickener (e.g. sodium carboxymethyl cellulose (CMC-Na)).

In some embodiments, the negative electrode plate can be prepared as follows: the above-mentioned components for preparing the negative electrode plate, such as the negative electrode active material, the conductive agent, the binder and any other components, are dispersed in a solvent (e.g. deionized water) to form a negative electrode slurry; and the negative electrode slurry is coated onto a negative electrode current collector, and is then subjected to procedures such as drying and cold pressing, so as to obtain the negative electrode plate.

[Electrolyte]

The electrolyte is located between the positive electrode plate and the negative electrode plate and functions for ionic conduction. The type of the electrolyte is not specifically limited in the present application, and can be selected according to actual requirements. For example, the electrolyte may be liquid, gel or all solid.

In some embodiments, the electrolyte is liquid and includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte further optionally comprises an additive. As an example, the additive may include a negative electrode film-forming additive and a positive electrode film-forming additive, and may further include an additive that can improve some performance of the battery, such as an additive that improves overcharge performance of the battery, or an additive that improves high-temperature performance or low-temperature performance of the battery.

[Separator]

In some embodiments, the secondary battery further comprises a separator. The type of the separator is not particularly limited in the present application, and any well-known porous-structure separator with good chemical stability and mechanical stability may be selected.

In some embodiments, the material of the separator may be selected from at least one of glass fibers, non-woven fabrics, polyethylene, polypropylene, and polyvinylidene fluoride. The separator may be a single-layer film and also a multi-layer composite film, and is not limited particularly. When the separator is a multi-layer composite film, the materials in the respective layers may be the same or different, which is not limited particularly.

In some embodiments, a positive electrode plate, a negative electrode plate and a separator can be subjected to a winding process or a laminating process to form an electrode assembly.

Figure 6:
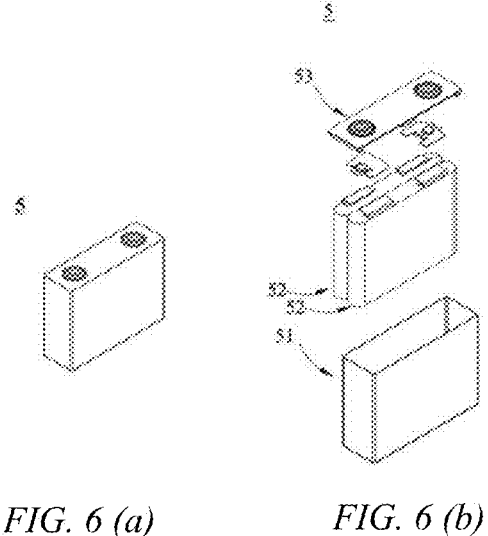
FIG. 6(a) shows a perspective view of a secondary battery according to some embodiments of the present application.
FIG. 6(b) shows an exploded view of a secondary battery according to some embodiments of the present application.

Referring to FIG. 6, an embodiment of the present application provides a secondary battery, comprising an electrode assembly, wherein the electrode assembly comprises the negative electrode plate according to any one of the above embodiments.

The shape of the secondary battery is not particularly limited in the present application, and may be cylindrical, square or of any other shape. For example, FIG. 6 shows a secondary battery 5 with a square structure as an example.

In some embodiments, referring to FIG. 6, an outer package may comprise a housing 51 and a cover plate 53. Herein, the housing 51 may comprise a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate and the separator can be subjected to a winding process or a laminating process to form an electrode assembly 52. The electrode assembly 52 is encapsulated in the accommodating cavity. The electrolyte is infiltrated into the electrode assembly 52. The number of the electrode assemblies 52 contained in the secondary battery 5 may be one or more, and can be selected by those skilled in the art according to actual requirements.

In some embodiments, a positive electrode plate, a negative electrode plate and a separator can be subjected to a winding process or a laminating process to form an electrode assembly.

In some embodiments, the secondary battery may comprise an outer package. The outer package can be used to encapsulate the above-mentioned electrode assembly and electrolyte.

In some embodiments, the outer package of the secondary battery can be a hard shell, for example, a hard plastic shell, an aluminum shell, a steel shell, etc. The outer package of the secondary battery may also be a soft bag, such as a pouch-type soft bag. The material of the soft bag may be plastics, and the examples of plastics may include polypropylene, polybutylene terephthalate, and polybutylene succinate, etc.

In some embodiments, the secondary battery can be assembled into a battery module, and the number of the secondary batteries contained in the battery module may be one or more, and the specific number can be selected by those skilled in the art according to the application and capacity of the battery module.

Figure 7:
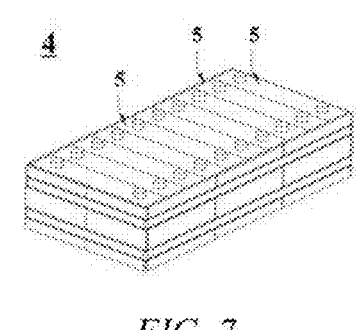
FIG. 7 is a schematic diagram of a battery module according to an embodiment of the present application.

Referring to FIG. 7, an embodiment of the present application provides a battery module, comprising the secondary battery according to any one of the above embodiments.

FIG. 7 shows a battery module 4 as an example. Referring to FIG. 7, in the battery module 4, a plurality of secondary batteries 5 may be arranged in sequence in the length direction of the battery module 4. Apparently, the secondary batteries may also be arranged in any other manner. Furthermore, the plurality of secondary batteries 5 may be fixed by fasteners.

Optionally, the battery module 4 may also comprise a housing with an accommodating space, and a plurality of secondary batteries 5 are accommodated in the accommodating space.

In some embodiments, the above-mentioned battery module may also be assembled into a battery pack, the number of battery modules included in the battery pack may be one or more, and the specific number can be selected by those skilled in the art according to the application and capacity of the battery pack.

Figure 8:
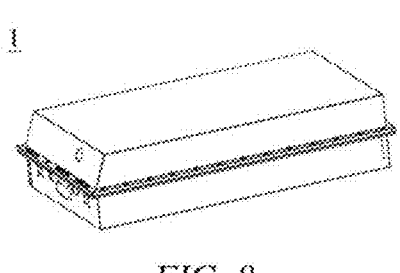
FIG. 8 is a schematic diagram of a battery pack according to an embodiment of the present application.
Figure 9:
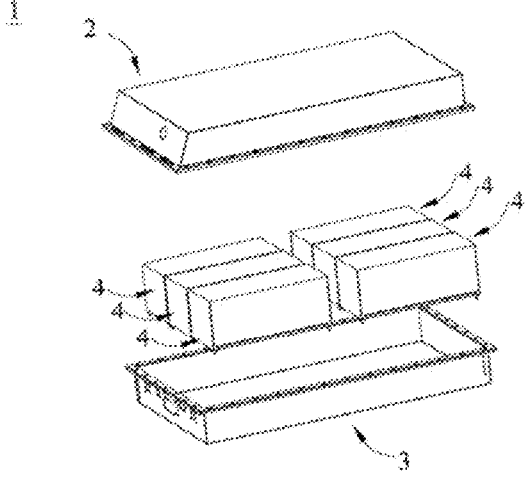
FIG. 9 is an exploded view of the battery pack according to the embodiment of the present application as shown in FIG. 8.

Referring to FIGS. 8 and 9, an embodiment of the present application provides a battery pack, comprising the battery module according to any one of the above embodiments.

Referring to FIG. 8 and FIG. 9, the battery pack 1 may comprise a battery box and a plurality of battery modules 4 provided in the battery box. The battery box comprises an upper box body 2 and a lower box body 3, wherein the upper box body 2 can cover the lower box body 3 to form a closed space for accommodating the battery modules 4. A plurality of battery modules 4 may be arranged in the battery box in any manner.

Figure 10:
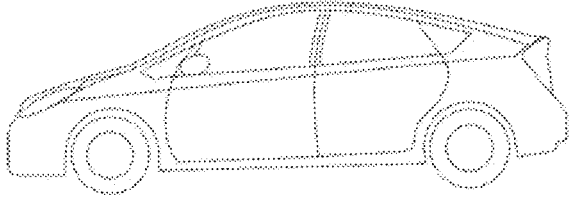
FIG. 10 is a schematic diagram of a power consuming device using a secondary battery according to an embodiment of the present application as a power source.

Referring to FIG. 10, an embodiment of the present application provides a power consuming device, comprising at least one selected from the secondary battery according to any one of the above embodiments, the battery module according to any one of the above embodiments or the battery pack according to any one of the above embodiments. The secondary battery, battery module or battery pack may be used as a power source of the power consuming device or as an energy storage unit of the power consuming device. The power consuming device may include a mobile device (e.g., a mobile phone, a laptop computer, etc.), an electric vehicle (e.g., a battery electric vehicle, a hybrid electric vehicle, a plug-in hybrid electric vehicle, an electric bicycle, an electric scooter, an electric golf cart, an electric truck, etc.), an electric train, a ship, a satellite, an energy storage system, etc., but is not limited thereto.

FIG. 10 shows a power consuming device as an example. The power consuming device may be a pure electric vehicle, a hybrid electric vehicle, a plug-in hybrid electric vehicle or the like. In order to meet the requirements of the power consuming device for a high power and a high energy density of a secondary battery, a battery pack or a battery module may be used.

EXAMPLES

Hereinafter, the examples of the present application will be explained. The examples described below are exemplary and are merely for explaining the present application, and should not be construed as limiting the present application. The techniques or conditions that are not specified in the examples are according to the techniques or conditions described in documents in the art or the product specification. The reagents or instruments used, if they are not marked with the manufacturer, are conventional products that are commercially available.

The solution of the present application will be described in detail below with reference to specific experiments.

I. Preparation of an Electrode Plate

Raw materials used in the following experiments are shown in the following table.

| Name | Manufacturer/brand/CAS |
| --- | --- |
| Conductive carbon black (SP) | Tianjin Tianyi Century Chemical Products Technology Development Co., Ltd. |
| Styrene butadiene rubber (SBR) | Tianjin Lugang Petroleum & Rubber Co., Ltd. |
| Carboxymethyl cellulose (CMC) | Wen'an County Changhong Cellulose Factory |
| Polyvinylidene fluoride (PVDF) | Guangdong Dongguan Agent Flurine Chemical |
| Thiourea $CH_4N_2S$ | Shandong Yifeng Biochemical Environmental Protection Co., Ltd. |
| Gelatin | Hengshui Yanruo Adhesive Co., Ltd./9000-70-8 |
| Copper chloride ($CuCl_2$) | Suzhou Jinrui Environmental Resources Protection Comprehensive Utilization Co., Ltd. |
| Ethylene carbonate (EC) | Shanghai Kaiyin Chemical Co., Ltd. |
| Diethyl carbonate (DEC) | Shanghai Kaiyin Chemical Co., Ltd. |
| Dimethyl carbonate (DMC) | Shanghai Kaiyin Chemical Co., Ltd. |

Example 1

1. Preparation of Negative Electrode Plate
1.1 Preparation of Negative Electrode Priming Coat Slurry A method for preparing a priming coat slurry in a main body region was as follows: SP, SBR and CMC were mixed at a weight ratio of SP:SBR:CMC=0.645:0.323:0.032, dissolved in water, and stirred uniformly in a vacuum mixer to obtain a slurry.

A method for preparing a priming coat slurry in a low-thermal-conductivity edge region was as follows: SP, SBR, CMC and thiourea were mixed at a weight ratio of SP:SBR:CMC:thiourea=0.545:0.323:0.032:0.1, dissolved in water, and stirred uniformly in a vacuum mixer to obtain a slurry.

1.2 Partitioned coating of negative electrode priming coat (low-thermal-conductivity edge regions on two sides)

A copper foil was provided as a negative electrode current collector, and the copper foil had the following dimensions: a thickness of 6 μm, a length of 2545 mm, and a width of 183 mm.

Coating of a priming coat on a first side: the surface of the first side of the negative electrode current collector was divided into a main body region and two low-thermal-conductivity edge regions. Both the main body region and the two low-thermal-conductivity edge regions extended in a length direction of the negative electrode current collector. The two low-thermal-conductivity edge regions were located on two sides of a long side of the main body region. The main body region had dimensions of 2545 mm×163 mm. The two low-thermal-conductivity edge regions each had dimensions of 2545 mm×10 mm. A gravure coating process was used to respectively apply the priming coat slurry of the main body region and the priming coat slurry of the low-thermal-conductivity edge regions to the main body region and the low-thermal-conductivity edge regions, with a coating thickness of 129 μm. After the coating, the priming coat slurry was dried in an oven at 100° C. for 6 h. Coating of a priming coat on a second side: the same partitioning and coating treatment was used as that of the surface of the first side, and the priming coat was applied to the surface of the second side of the negative electrode current collector.

After the coating of the priming coat on the first side and the coating of the priming coat on the second side, the current collector with the priming coat was obtained.

1.3 Preparation of Negative Electrode Active Slurry

A method for preparing a negative electrode active slurry was as follows: graphite/hard carbon, SBR (as a binder) and CMC (as a dispersant) were mixed at a weight percentage ratio of 97%:1%:2%, diluted with an appropriate amount of distilled water, and then stirred in a vacuum mixer to form a uniform negative electrode active slurry.

1.4 Coating of Negative Electrode Active Material

Coating on the first side: the negative electrode active slurry prepared in step (2) was applied to the surface of the first side of the current collector with the priming coat. After the coating, the negative electrode active slurry was dried in an oven at 100° C. for 6 h.

The same process for coating of the negative electrode active slurry as that of the first side was used for the coating of the second side, to coat the surface of the second side of the current collector with the priming coat. After the coating, the negative electrode active slurry was dried in an oven at 100° C. for 6 h.

The negative electrode plate of Example 1 was obtained. On a single side basis, the negative electrode active material had a load of 0.160 g/1540.25 mm$^2$.

2. Preparation of Positive Electrode Plate 2.1 Preparation of Positive Electrode Active Slurry Positive electrode active materials LiNi$_{0.33}$Co$_{0.33}$Mn$_{0.33}$O$_2$, SP and PVDF were mixed at a weight percentage ratio of 97%:1.5%:1.5%, diluted with an appropriate amount of N-methylpyrrolidone, and then stirred in a vacuum mixer to form a uniform positive electrode active slurry.

2.2 Coating of Positive Electrode Active Material

A copper foil was provided as a positive electrode current collector. The positive electrode current collector had the following dimensions: a thickness of 13 μm, a length of 2460 mm, and a width of 179 mm.

The positive electrode active slurry was applied to a first side of the positive electrode current collector for single-side coating. After the coating, the positive electrode active slurry was dried in an oven at 100° C. for 6 h. Then the positive electrode active slurry was coated on a second side of the positive electrode current collector for single-side coating. After the coating, the positive electrode active slurry was dried in an oven at 100° C. for 6 h.

The positive electrode plate of Example 1 was obtained. On a single side basis, the positive electrode active material had a load of 0.304 g/1540.25 mm$^2$.

3. Preparation of Secondary Battery 3.1 Tabs were respectively mounted on a long side of the positive electrode plate and a long side of the negative electrode plate, and then were sequentially laminated and wound with a separator to form a wound core, i.e., an electrode assembly (with dimensions of 28 cm×148 cm×118 cm). A first low-thermal-conductivity edge region was a low-thermal-conductivity edge region close to the tab, and a second low-thermal-conductivity edge region was a low-thermal-conductivity edge region away from the tab. The electrode assembly was placed in an outer package, and 150 g of electrolyte was injected. The electrolyte was a solution containing 1 M LiPF$_6$, and a solvent of the solution was a product obtained by mixing EC, DEC and DMC at a volume ratio of 1:1:1. After packaging with the outer package, a secondary battery was obtained.

In one secondary battery, the negative electrode active material had a load of 96.76 g, and the positive electrode active material had a load of 173.8 g.

Example 2

Example 2 differed from Example 1 only in a formula of a priming coat slurry in a low-thermal-conductivity edge region. In step 1.1 of Example 3, the formula of the priming coat slurry in the low-thermal-conductivity edge region was as follows: in weight ratio, SP:SBR:CMC:gelatin=0.545: 0.323:0.032:0.1. Refer to Example 1 for parameters of other steps.

Example 3

Example 3 differed from Example 1 in a formula of a priming coat slurry in a low-thermal-conductivity edge region. In step 1.1 of Example 3, the formula of the priming coat slurry in the low-thermal-conductivity edge region was as follows: in weight ratio, SP:SBR:CMC:copper chloride=0.545:0.323:0.032:0.1. Refer to Example 1 for parameters of other steps.

Example 4

Example 4 differed from Example 1 in (1)-(2) as follows:

(1) Formula of priming coat slurry in low-thermal-conductivity edge region

In step 1.1 of Example 4, the formula of the priming coat slurry in the low-thermal-conductivity edge region was as follows: in weight ratio, SP:SBR:CMC:copper chloride=0.545:0.323:0.032:0.1.

(2) Partitioned coating of negative electrode priming coat (low-thermal-conductivity edge region on single side)

In step 1.2 of Example 4:

a copper foil was provided as a negative electrode current collector, and the copper foil had the following dimensions: a thickness of 6 μm, a length of 2545 mm, and a width of 183 mm.

Coating of a priming coat on a first side: the surface of the first side of the negative electrode current collector was divided into a main body region and a first low-thermal-conductivity edge region. Both the main body region and the first low-thermal-conductivity edge region extended in a length direction of the negative electrode current collector. The first low-thermal-conductivity edge region was located on a side of a first long side (a long side for subsequently mounting a tab) of the main body region. The main body region had dimensions of 2545 mm×173 mm. The first low-thermal-conductivity edge region had dimensions of 2545 mm×10 mm. A gravure coating process was used to respectively apply the priming coat slurry of the main body region and the priming coat slurry of the low-thermal-conductivity edge region to the main body region and the low-thermal-conductivity edge region, with a coating thickness of 129 μm. After the coating, the priming coat slurry was dried in an oven at 100° C. for 6 h.

Coating of a priming coat on a second side: the same partitioning and coating treatment was used as that of the surface of the first side, and the priming coat was applied to the surface of the second side of the negative electrode current collector.

After the coating of the priming coat on the first side and the coating of the priming coat on the second side, the current collector with the priming coat was obtained.

Refer to Example 1 for parameters of other steps.

Example 5

Example 5 differed from Example 1 in (1)-(2) as follows:

(1) Formula of priming coat slurry in low-thermal-conductivity edge region

In step 1.1 of Example 5, the formula of the priming coat slurry in the low-thermal-conductivity edge region was as follows: in weight ratio, SP:SBR:CMC:copper chloride=0.545:0.323:0.032:0.1.

(2) Partitioned coating of negative electrode priming coat (low-thermal-conductivity edge region on single side)

In step 1.2 of Example 5:

a copper foil was provided as a negative electrode current collector, and the copper foil had the following dimensions: a thickness of 6 μm, a length of 2545 mm, and a width of 183 mm.

Coating of a priming coat on a first side: the surface of the first side of the negative electrode current collector was divided into a main body region and a second low-thermal-conductivity edge region. Both the main body region and the second low-thermal-conductivity edge region extended in a length direction of the negative electrode current collector. The second low-thermal-conductivity edge region was located on a side of a second long side (a long side away from the tab) of the main body region. The main body region had dimensions of 2545 mm×173 mm. The second low-thermal-conductivity edge region had dimensions of 2545 mm×10 mm. A gravure coating process was used to respectively apply the priming coat slurry of the main body region and the priming coat slurry of the low-thermal-conductivity edge region to the main body region and the low-thermal-conductivity edge region, with a coating thickness of 129 μm. After the coating, the priming coat slurry was dried in an oven at 100° C. for 6 h.

Coating of a priming coat on a second side: the same partitioning and coating treatment was used as that of the surface of the first side, and the priming coat was applied to the surface of the second side of the negative electrode current collector.

After the coating of the priming coat on the first side and the coating of the priming coat on the second side, the current collector with the priming coat was obtained.

Refer to Example 1 for parameters of other steps.

Comparative Example 1

Comparative Example 1 differed from Example 1 as follows:

in step 1.2 of Comparative Example 1, no partitioned coating of a negative electrode priming coat was provided. Details were as follows:

a copper foil was provided as a negative electrode current collector, and the copper foil had the following dimensions: a thickness of 6 μm, a length of 2545 mm, and a width of 183 mm. A gravure coating process was used to apply the priming coat slurry of the main body region to surfaces of two sides of the negative electrode current collector, with a coating thickness of 129 μm. After the coating, the priming coat slurry was dried in an oven at 100° C. for 6 h. After the coating, the current collector with the priming coat was obtained.

Refer to Example 1 for parameters of other steps.

Analysis and Test Items

1. Determination of Thermal Conductivity (λ)

Thermal conductivities of the low-thermal-conductivity edge region and the main body region of the negative electrode plate were detected with reference to the standard "ISO 22007-2:2008 Determination of Thermal Conductivity of Material by Transient Plane Heat Source Method".

(1) Sampling Method as Follows:

an electrode plate was cut with a stamping knife, with cut positions respectively located in the low-thermal-conductivity edge region (a region which was 10 mm from the edge of the negative electrode plate) and the main body region (a region near the center of the electrode plate); size of a cut sample (rectangle:5 mm (horizontal)*7 mm (vertical))

(2) Detection Method as Follows:

a device for measurement using a transient plane heat source method was used. During measurement, two samples with the same thickness were first selected. After the thickness of the samples was accurately measured, the two thin-plate samples were respectively placed on two sides of a probe, and then pressed tightly with two pieces of identical thermal insulation material, so that there was no gap between the probe and the samples, so as to ensure that all heat generated by the probe was absorbed by the samples.

For Examples 1-3, thermal conductivities of the main body region, the first low-thermal-conductivity edge region and the second low-thermal-conductivity edge region were separately detected, and named $\lambda_1$, $\lambda_{2a}$, and $\lambda_{2b}$. For Example 4, thermal conductivities of the main body region and the first low-thermal-conductivity edge region were separately detected, and named $\lambda_1$ and $\lambda_{2a}$. For Example 5, thermal conductivities of the main body region and the second low-thermal-conductivity edge region were separately detected, and named $\lambda_1$ and $\lambda_{2b}$.

2. Determination of electrical conductivity (σ) of main body region/low-thermal-conductivity edge region of negative electrode plate The electrical conductivities of the low-thermal-conductivity edge region and the main body region of the negative electrode plate were detected with reference to the standard "GB/T 11007-2008 Test Method of Electrical Conductivity Analyzers".

(1) Sampling Method as Follows

An electrode plate was cut with a stamping knife, with cut positions respectively located in the low-thermal-conductivity edge region (a region which was 10 mm from the edge of the negative electrode plate) and the main body region (a region near the center of the electrode plate). Samples of 5 mm (horizontal)*7 mm (vertical) were extracted in the long-side direction (MD direction) by using the stamping knife.

(2) Detection Method as Follows

A testing instrument was a two-probe diaphragm resistance tester. Test results are shown in Table 1.

For Examples 1-3, thermal conductivities of the main body region, the first low-thermal-conductivity edge region and the second low-thermal-conductivity edge region were separately detected, and named $\sigma_1$, $\sigma_{2a}$, and $\sigma_{2b}$. For Example 4, thermal conductivities of the main body region and the first low-thermal-conductivity edge region were separately detected, and named $\sigma_1$ and $\sigma_{2a}$. For Example 5, thermal conductivities of the main body region and the second low-thermal-conductivity edge region were separately detected, and named $\sigma_1$ and $\sigma_2 b$.

3. Rules for Determining Lithium Precipitation Degree as Follows

A secondary battery was subjected to a cyclic charging and discharging procedure, with a charging and discharging current of 0.33 C and the number of cycles being 1000. After the cyclic charging and discharging procedure was finished, the secondary battery was disassembled, and the lithium precipitation degree of the negative electrode plate was evaluated.

A method for evaluating the lithium precipitation degree is as follows:

no lithium precipitation: a single electrode assembly has no lithium precipitation region;

primary lithium precipitation: the maximum area of a single lithium precipitation region≤5*5 mm², and the number of lithium precipitation regions of the single electrode assembly≤1;

secondary lithium precipitation: 5*5 mm²<the maximum area of a single lithium precipitation region≤10*10 mm², and the number of lithium precipitation regions of the single electrode assembly≤1;

tertiary lithium precipitation: the previous two-stage determining conditions were not met.

4. Calculation of Kinetic Coefficient

Through analysis of the electrical conductivities, thermal conductivities and lithium precipitation degrees of the main body region and the edge region, in the present application, the following empirical coefficient-kinetic coefficient Q and a relationship between the kinetic coefficient Q and lithium precipitation of a secondary battery were summarized.

$$Q = \frac{\lambda_2 - \lambda_1}{\lambda_2} - \frac{1.2(\sigma_2 - \sigma_1)}{\sigma_2}$$

5. Tensile Elongation

Samples were cut from the negative electrode plates in Examples 1-5 and Comparative Example 1 and then elongated, and the elongated samples had a gauge length of 50 mm and a width of 20 mm.

A tensile machine was used for a tensile test, with a gauge length of 50±0.5 mm and a tensile speed of 2 mm/min. After the tensile operation was completed, the tensile elongation was calculated based on the following formula:

Tensile elongation=tensile displacement÷gauge length (50 mm)

For the test details not described in detail, reference may be made to the general test standards in the art, such as GB/T228-2002 Metallic Materials—Tensile testing at Ambient Temperature.

As shown in Comparative Example 1 of Table 1, when neither the first low-thermal-conductivity edge region nor the second low-thermal-conductivity edge region was provided on the negative electrode plate of the secondary battery, the secondary battery of Comparative Example 1 had poor performance with secondary lithium precipitation.

(2) About Q Value

As shown in Examples 1-5 of Table 1, when the above kinetic coefficient Q is greater than 0, especially when Q>0.1, no lithium precipitation occurred in the negative electrode plate or only primary lithium precipitation was shown.

As shown in Comparative Example 1 of Table 1, when the kinetic coefficient Q is equal to 0, secondary lithium precipitation occurred in the negative electrode plate.

The reasoning for the improvement of a lithium precipitation state of the secondary battery in Examples 1-5 without being limited by theory may be as follows:

firstly, in the present application, it has been found that when a secondary battery (such as a lithium ion battery) is charged, Li$^+$ is deintercalated from the positive electrode, and the Li$^+$ diffuses to the negative electrode surface in the

TABLE 1

| | Partition state/dimension | | | Thermal conductivity of each region | | | Electrical conductivity of each region ($10^7$) | | | Lithium | | |
| | First low-thermal-conductivity edge region Width/mm | Main body region Width/mm | Second low-thermal-conductivity edge region Width/mm | $\lambda_{2a}$ (±2) | $\lambda_1$ (±2) | $\lambda_{2b}$ (±2) | $\sigma_{2a}$ (±0.2) | $\sigma_1$ (±0.2) | $\sigma_{2b}$ (±0.2) | precipitation degree | Q value | Elongation |
|---|---|---|---|---|---|---|---|---|---|---|---|---|
| Example 1 | 10 | 163 | 10 | 269 | 350 | 269 | 5.15 | 5.66 | 5.15 | No lithium precipitation | 0.12 | 0.8 |
| Example 2 | 10 | 163 | 10 | 282 | 350 | 282 | 5.23 | 5.66 | 5.23 | No lithium precipitation | 0.10 | 0.7 |
| Example 3 | 10 | 163 | 10 | 257 | 350 | 257 | 5.10 | 5.66 | 5.10 | No lithium precipitation | 0.15 | 0.9 |
| Example 4 | No provision of the first low-thermal-conductivity edge region | 173 | 10 | \ | 350 | 257 | \ | 5.66 | 5.10 | Primary lithium precipitation | 0.15 | 0.6 |
| Example 5 | 10 | 173 | No provision of the second low-thermal-conductivity edge region | 257 | 350 | \ | 5.10 | 5.66 | \ | Primary lithium precipitation | 0.15 | 0.6 |
| Comparative Example 1 | No provision of the first low-thermal-conductivity edge region | 183 | No provision of the second low-thermal-conductivity edge region | 350 | 350 | 350 | 5.66 | 5.66 | 5.66 | Secondary lithium precipitation | 0 | 0.5 |

(1) About Thermal Conductivity

As shown in Examples 1-3 of Table 1, when the first low-thermal-conductivity edge region and the second low-thermal-conductivity edge region were provided on the negative electrode plate of the secondary battery, the first low-thermal-conductivity edge region and the second low-thermal-conductivity edge region had thermal conductivities less than that of the main body region, and the secondary batteries of Examples 1-3 had excellent performance without lithium precipitation.

As shown in Examples 4-5 of Table 1, when the first low-thermal-conductivity edge region or the second low-thermal-conductivity edge region was provided on the negative electrode plate of the secondary battery, the first low-thermal-conductivity edge region and the second low-thermal-conductivity edge region had thermal conductivities less than that of the main body region, and the secondary batteries of Examples 4-5 had good performance with only primary lithium precipitation.

electrolyte and are intercalated in a negative electrode material. However, due to obstruction of ohmic resistance and a charge transfer and diffusion process, some Li$^+$ cannot be smoothly inserted into the negative electrode material, so that a side reaction of lithium deposition, i.e., lithium precipitation, occurs on the surface of the negative electrode plate.

Further, in the present application, it has been creatively found that a gap is prone to occurring at an edge of the negative electrode due to a winding process. This leads to preferential deposition of lithium on the edge of the negative electrode.

Further, in the present application, the low-thermal-conductivity edge region is creatively provided at the edge of the negative electrode plate. Therefore, during operation of the secondary battery, the low-thermal-conductivity edge region has a greater temperature. This improves the diffusion and intercalation process of Li$^r$, and then improves the lithium precipitation state of the negative electrode, especially the lithium precipitation state in the edge region.

Further, in the present application, on the basis of providing the low-thermal-conductivity edge region, attention is also paid to the electrical conductivities of the main body region and the edge region. Under the condition of fully considering the influence of dual factors, the electrical conductivity and the thermal conductivity, on the lithium intercalation kinetics of the edge region of the negative electrode, in the present application, the innovative kinetic coefficient Q and the relationship between the kinetic coefficient Q and lithium precipitation of the secondary battery are creatively summarized and put forward.

$$Q = \frac{\lambda_2 - \lambda_1}{\lambda_2} - \frac{1.2(\sigma_2 - \sigma_1)}{\sigma_2}$$

Experimental data showed that when the kinetic coefficient Q was controlled to be greater than 0, especially when Q>0.1, no lithium precipitation occurred in the negative electrode plate or only primary lithium precipitation was shown.

(3) About Mechanical Properties

As shown in Examples 1-3 of Table 1, when the first low-thermal-conductivity edge region and the second low-thermal-conductivity edge region were provided on the negative electrode plate of the secondary battery, the first low-thermal-conductivity edge region and the second low-thermal-conductivity edge region had thermal conductivities less than that of the main body region, and the secondary batteries of Examples 1-3 had excellent mechanical properties, with the elongation of 0.6.

As shown in Examples 4-5 of Table 1, when the first low-thermal-conductivity edge region or the second low-thermal-conductivity edge region was provided on the negative electrode plate of the secondary battery, the first low-thermal-conductivity edge region and the second low-thermal-conductivity edge region had thermal conductivities less than that of the main body region, and the negative electrode plates of Examples 4-5 had good mechanical properties, with the elongation of 0.7-0.9.

As shown in Comparative Example 1 of Table 1, when neither the first low-thermal-conductivity edge region nor the second low-thermal-conductivity edge region was provided on the negative electrode plate of the secondary battery, the mechanical properties of the secondary battery of Comparative Example 1 were not so good as those of Examples 1-5, with the elongation of 0.5.

The above technical findings are proposed for the first time in the present application, and are unexpected by those skilled in the art.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

The invention claimed is:

1. A negative electrode plate, characterized in that,
the negative electrode plate comprises a main body region and at least one low-thermal-conductivity edge region;
the low-thermal-conductivity edge region and the main body region respectively have thermal conductivities of $\lambda_2$ and $\lambda_1$, where $\lambda_2 < \lambda_1$; and
the negative electrode plate comprises a current collector layer and an active material layer, wherein
a priming coat belonging to the low-thermal-conductivity edge region is further provided between the current collector layer belonging to the low-thermal-conductivity edge region and the active material layer belonging to the low-thermal-conductivity edge region;
a priming coat belonging to the main body region is further provided between the current collector layer belonging to the main body region and the active material layer belonging to the low-thermal-conductivity edge region; and
the priming coat belonging to the low-thermal-conductivity edge region and the priming coat belonging to the main body region respectively have thermal conductivities of $\lambda_{22}$ and $\lambda_{12}$, where $\lambda_{22} < \lambda_{12}$.

2. The negative electrode plate according to claim 1, characterized by any one of the following:
(1) a ratio $\lambda_1/\lambda_2$ of $\lambda_1$ to $\lambda_2$ being 1.1-1.5:1;
(2) $\lambda_1$ having a value of 300-400 W/(m·K);
(3) $\lambda_2$ having a value of 200-300 W/(m·K).

3. The negative electrode plate according to claim 1, wherein the low-thermal-conductivity edge region and the main body region respectively have electrical conductivities of $\sigma_2$ and $\sigma_1$; and
the negative electrode plate meets a kinetic coefficient Q>0, and the kinetic coefficient Q is calculated by using the following formula:

$$Q = \frac{\lambda_2 - \lambda_1}{\lambda_2} - \frac{1.2(\sigma_2 - \sigma_1)}{\sigma_2}.$$

4. The negative electrode plate according to claim 1, characterized by any one of the following:
(1) a ratio $\sigma_1/\sigma_2$ of $\sigma_1$ to $\sigma_2$ being 1.3 or less;
(2) $\sigma_1$ having a value of $5.3 \times 10^7$-$5.9 \times 10^7$ μS·cm$^{-1}$;
(3) $\sigma_2$ having a value of $5.0 \times 10^7$-$5.3 \times 10^7$ μS·cm$^{-1}$.

5. The negative electrode plate according to claim 1, characterized in that, the negative electrode plate comprises a current collector layer; and
the current collector layer belonging to the low-thermal-conductivity edge region and the current collector layer belonging to the main body region respectively have thermal conductivities of $\lambda_{21}$ and $\lambda_{11}$, where $\lambda_{21} < \lambda_{11}$.

6. The negative electrode plate according to claim 1, characterized in that, the negative electrode plate comprises an active material layer; and
the negative electrode active material layer belonging to the low-thermal-conductivity edge region and the negative electrode active material layer belonging to the main body region respectively have thermal conductivities of $\lambda_{23}$ and $\lambda_{13}$, where $\lambda_{23} < \lambda_{13}$.

7. The negative electrode plate according to claim 1, characterized in that, the priming coat belonging to the low-thermal-conductivity edge region comprises a thermal resistance material, the priming coat belonging to the main body region comprises conductive carbon black, and the thermal resistance material has a thermal conductivity less than that of the conductive carbon black.

8. The negative electrode plate according to claim 7, characterized in that, the priming coat belonging to the main body region does not comprise the thermal resistance material; or the priming coat belonging to the main body region comprises the thermal resistance material, but the content of the thermal resistance material in the priming coat belonging to the main body region is less than that in the priming coat belonging to the low-thermal-conductivity edge region.

9. The negative electrode plate according to claim 7, characterized in that, the thermal resistance material is selected from one or more of the following: gelatin, ammonium sulfate, ammonium chloride, thiourea, and copper chloride.

10. The negative electrode plate according to claim 1, characterized in that, the priming coat belonging to the main body region comprises the following components:

60 wt %-70 wt % of conductive carbon black; and 30 wt %-40 wt % of binder.

11. The negative electrode plate according to claim 1, wherein the negative electrode plate comprises a first low-thermal-conductivity edge region and/or a second low-thermal-conductivity edge region, and the main body region comprises a first long side and a second long side which are parallel to each other;

the first low-thermal-conductivity edge region is located outside the first long side of the main body region; and the second low-thermal-conductivity edge region is located outside the second long side of the main body region.

12. The negative electrode plate according to claim 1, wherein the negative electrode plate features one or more of the following:

(1) an outer side of the low-thermal-conductivity edge region is next to an edge of the negative electrode plate;

(2) a distance between an inner side of the low-thermal-conductivity edge region and the edge of the negative electrode plate is w, the negative electrode plate has a width of W, and a ratio W/w of W to w is equal to 11.5-21.9:1;

optionally, w=8-15 mm; and optionally, W=100-200 mm;

(3) an outer side of one or more sides of the main body region is provided with a low-thermal-conductivity edge region;

(4) an area of the main body region accounts for 78.1%-88.5% of a unilateral area of the negative electrode plate;

(5) an area of the low-thermal-conductivity edge region accounts for 11.5%-21.9% of the unilateral area of the negative electrode plate; and (6) a ratio of the area of the main body region to the area of the low-thermal-conductivity edge region is 3.6-7.7:1.

13. A secondary battery, comprising an electrode assembly, wherein the electrode assembly comprises the negative electrode plate according to claim 1.

14. A battery module, comprising the secondary battery of claim 13.

15. A battery pack, comprising the battery module of claim 14.

16. A power consuming device, comprising the battery pack of claim 15.

17. A negative electrode plate, characterized in that, the negative electrode plate comprises a main body region and at least one low-thermal-conductivity edge region;

the low-thermal-conductivity edge region and the main body region respectively have thermal conductivities of $\lambda_2$ and $\lambda_1$, where $\lambda_2 < \lambda_1$; and the negative electrode plate comprises a current collector layer and an active material layer, wherein a priming coat belonging to the low-thermal-conductivity edge region is further provided between the current collector layer belonging to the low-thermal-conductivity edge region and the active material layer belonging to the low-thermal-conductivity edge region; and the active material layer belonging to the main body region is directly laminated on the current collector layer belonging to the main body region.

18. The negative electrode plate according to claim 17, characterized in that, the priming coat belonging to the low-thermal-conductivity edge region comprises the following components:

50 wt %-60 wt % of conductive carbon black;

5 wt %-15 wt % of thermal resistance material; and 30 wt %-40 wt % of binder.

19. The negative electrode plate according to claim 17, characterized by any one of the following:

(1) a ratio $\lambda_1/\lambda_2$ of $\lambda_1$ to $\lambda_2$ being 1.1-1.5:1;

(2) $\lambda_1$ having a value of 300-400 W/(m·K);

(3) $\lambda_2$ having a value of 200-300 W/(m·K).

20. The negative electrode plate according to claim 17, wherein the low-thermal-conductivity edge region and the main body region respectively have electrical conductivities of $\sigma_2$ and $\sigma_1$; and the negative electrode plate meets a kinetic coefficient Q>0, and the kinetic coefficient Q is calculated by using the following formula:

$$Q = \frac{\lambda_2 - \lambda_1}{\lambda_2} - \frac{1.2(\sigma_2 - \sigma_1)}{\sigma_2}.$$

* * * * *